United States Patent [19]

Misra

[11] Patent Number: 4,468,375
[45] Date of Patent: Aug. 28, 1984

[54] PRODUCTION OF ALUMINA FROM ALUMINUM-CONTAINING MINERAL ORES WITH SODIUM BICARBONATE

[75] Inventor: Chanakya Misra, Pittsburgh, Pa.

[73] Assignee: Aluminum Company of America, Pittsburgh, Pa.

[21] Appl. No.: 423,898

[22] Filed: Sep. 27, 1982

[51] Int. Cl.$^3$ ............................................... C01F 7/20
[52] U.S. Cl. .................................... 423/122; 423/121; 423/119; 423/127; 423/131; 423/115; 423/419 P
[58] Field of Search ..................... 423/115, 122, 419 P, 423/121, 131

[56] References Cited

U.S. PATENT DOCUMENTS

| | | | |
|---|---|---|---|
| 1,196,734 | 8/1916 | Frazer et al. | 423/122 |
| 2,783,127 | 2/1957 | Grote | 23/61 |
| 3,501,264 | 3/1970 | Pilato et al. | 23/52 |
| 3,859,413 | 1/1975 | Haas . | |
| 3,983,212 | 9/1976 | Lowenstein et al. | 423/119 |
| 4,221,771 | 9/1980 | van der Heem | 423/419 |
| 4,265,864 | 5/1981 | Sugahara et al. | 423/121 |

FOREIGN PATENT DOCUMENTS 1570261 6/1980 United Kingdom .

OTHER PUBLICATIONS

U.S. Department of Energy Report LETC/RI-80/8 entitled "Thermal Behavior of Dawsonite", by Francis J. Keenan et al.

Primary Examiner—Herbert T. Carter
Attorney, Agent, or Firm—Glenn E. Klepac

[57] ABSTRACT

A process for the production of alumina from aluminum-containing mineral ores, such as bauxite, comprising comminuting the aluminum-containing mineral ore, then reacting the comminuted mineral ore at an elevated temperature with an aqueous solution having at least 150 grams per liter of sodium bicarbonate which forms a solid reaction product containing dawsonite and impurities, and finally converting the dawsonite to alumina.

20 Claims, 1 Drawing Figure

FLOW DIAGRAM for ALUMINA PRODUCTION PROCESS

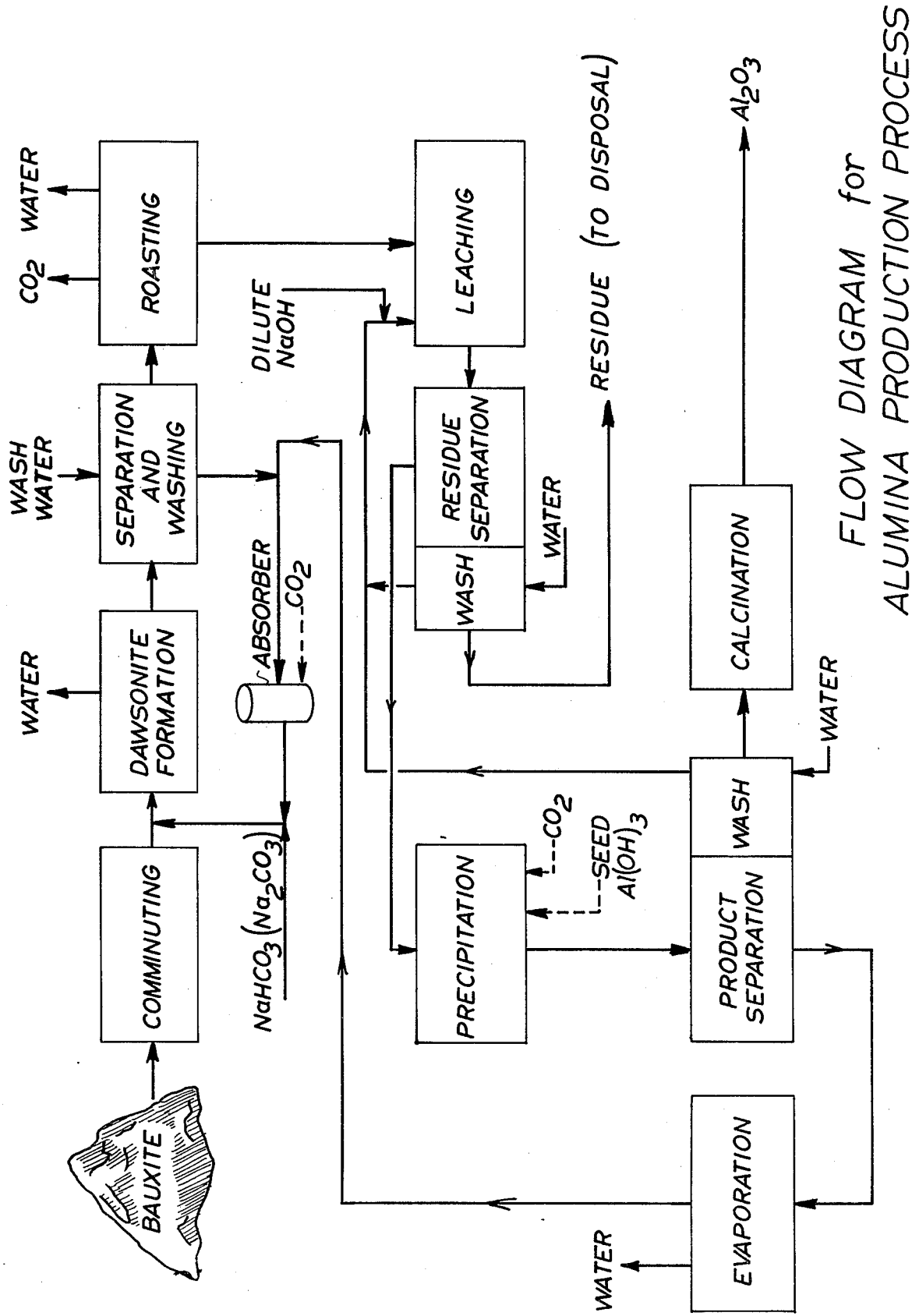

PRODUCTION OF ALUMINA FROM ALUMINUM-CONTAINING MINERAL ORES WITH SODIUM BICARBONATE

BACKGROUND OF THE INVENTION

The present invention relates to a process for the production of alumina from aluminum-containing mineral ore. More particularly, the invention presents a novel process for the production of alumina from bauxite and other similar aluminous mineral ores.

A substantial portion of the world's aluminum needs today are met by the Bayer process for alumina extraction from bauxite. While the Bayer process offers an economically attractive process for the extraction of alumina from bauxite, several important disadvantages are inherent in the Bayer process. First, the Bayer process extracts only the caustic extractable alumina in the bauxite. The alumina associated with silicate minerals present in the bauxite is generally not extracted. Further, between 5 to 10% of the extractable alumina cannot be recovered due to inefficiencies inherent in the process. Second, the caustic soda also reacts with silica minerals present in the bauxite. The extent of this "chemical caustic loss" is dependent upon the amount of caustic reactive silica minerals present in the bauxite. Third, after the alumina extraction, the remaining residue is highly caustic and the slimy nature of this residue or "mud" poses problems in washing the residue. Also, any sodium aluminum silicates present in the residue hydrolyze in the wash water releasing alkali. Further, the disposal of the slimy, caustic residue presents significant environmental concerns to the alumina industry. Fourth, the Bayer process alumina product generally contains various inorganic impurities, such as iron oxide, silica and titanium oxide. The reduction or elimination of these inorganic product impurities, which are related to the basic chemistry of the Bayer process, is considerably expensive. Fifth, the process efficiency is lowered by impurities, such as silica and sodium carbonate, which accumulate in the caustic liquor which is recirculated to the initial step of bauxite digestion in the Bayer process. Controlling impurities present in the recirculated caustic liquor significantly affects the overall production and capital costs associated with the Bayer process.

Processes for producing dawsonite from alumina trihydrate are known in the prior art. For example, U.S. Pat. No. 4,221,771 to van der Heem discloses a process for the production of dawsonite. In this process, alumina trihydrate, which is preferably gibbsite, is reacted with sodium bicarbonate in a sodium carbonate solution. The concentration of the alumina trihydrate is not greater than 86 grams per liter of the sodium carbonate solution. A sufficient amount of sodium bicarbonate is added to react with all of the alumina trihydrate, but the sodium bicarbonate concentration is less than 150 grams per liter, preferably between 52 and 82 grams per liter. The concentration of the sodium carbonate is from 150 to 300 grams per liter. The reaction time is from 30 minutes to 4 hours, and the reaction temperature is between 100° and 200° C. The reaction pressure required is higher than atmospheric pressure, preferably below 18 kilograms per $cm^2$, and more preferably between 8.7 and 9.5 kilograms per $cm^2$.

British Patent Specification No. 1,570,261, published June 25, 1980 discloses a process whereby basic aluminum sodium carbonate is produced by the reaction of aluminum hydroxide with an aqueous sodium bicarbonate solution. This patent specification mentions that the reaction temperature is from 160° to 240° C. and the reaction pressure is from 5 to 50 atmospheres. The aluminum hydroxide is in the form of a suspension in the sodium bicarbonate solution, with the suspension being agitated by stirring. Further, the reaction temperature to be employed from the above-mentioned temperature range is chosen in relation to the length desired for the resulting crystal fibers. The patent specification notes that the starting material, aluminum trihydroxide, is a pure material.

U.S. Department of Energy Report LETC/RI-80/8 entitled "Thermal Behavior of Dawsonite" discusses the thermal decomposition of dawsonite. The report indicates that synthetic dawsonite was used and the temperature range under consideration was from 250° C. to 800° C. The report indicates that heating the dawsonite from 350° to 550° C. decomposes the dawsonite to sodium carbonate and rho-alumina, as well as producing carbon dioxide and water. The report further indicates that heating the sodium carbonate and rho-alumina at reaction temperatures of 600° C. and higher produces an incomplete solid state reaction whereby the sodium carbonate and rho-alumina react to form crystalline sodium aluminate, as well as carbon dioxide.

U.S. Pat. No. 3,501,264 to Pilato et al. discloses a process whereby an aluminum salt is reacted with an alkali metal carbonate to produce a basic alkali aluminum carbonate. In the process disclosed in this patent, an aqueous solution of an alkali metal carbonate and an aqueous solution of an aluminum salt are prepared. Prior to admixing these two solutions, the patent discloses an important feature whereby a small amount of sodium gluconate is added to either the aluminum salt solution or the alkali metal carbonate solution. The two solutions are then mixed together at a temperature of from about 20° to 95° C., and the solutions are constantly stirred and maintained at said temperature range for a period of at least 1 hour to allow formation of a basic alkali aluminum carbonate slurry. The slurry is then cooled and aged for at least 2 hours and then filtered to obtain a basic alkali aluminum carbonate filter cake. The filter cake is then washed and dried.

SUMMARY OF THE INVENTION

In view of the above-mentioned disadvantages of the Bayer process, it is an object of the present invention to provide a novel process for refining bauxite or other aluminous mineral ores to produce alumina.

A more specific objective of the present invention is to provide an economically attractive alternative to the Bayer process for producing alumina from bauxite which substantially avoids or reduces the previously mentioned disadvantages inherent in the Bayer process by: (i) using an aqueous solution containing sodium bicarbonate rather than aqueous sodium hydroxide in the initial bauxite digestion, resulting in a substantial cost savings; (ii) substantially minimizing the extractable alumina loss over that in the Bayer process; (iii) substantially minimizing the presence of inorganic impurities, such as iron oxide, silica and titanium oxide, in the resultant alumina product; and (iv) improving the efficiency of the alumina production process by minimizing the amount of impurities in the liquor remaining at the completion of the process which can then be appropriately replenished and recirculated to the initial reaction step with the bauxite.

These objectives, as well as other objectives of the present invention, will become apparent from the discussion which follows in the Description of the Preferred Embodiments.

In a broad sense, the present invention provides a process for the production of alumina from aluminum-containing mineral ore comprising: first, comminuting an aluminum-containing mineral ore; second, reacting the comminuted mineral ore at an elevated temperature with an aqueous solution containing at least 150 grams per liter of sodium bicarbonate, thereby to form a solid reaction product comprising dawsonite and impurities; and, finally, converting the dawsonite to alumina.

BRIEF DESCRIPTION OF THE DRAWING

The sole drawing is a flow diagram showing the preferred process of the present invention, using bauxite as the aluminum-containing mineral ore.

DESCRIPTION OF THE PREFERRED EMBODIMENTS

The flow diagram in the FIGURE shows the preferred process of the present invention for producing alumina from bauxite. While the preferred process is shown using bauxite as the starting material, other aluminum-containing mineral ores, such as kaolinite and aluminous clays having an alumina content of from about 20 to 40 weight percent, can also be used in the process of the present invention. If kaolinite is the available starting material, it is preferred that the kaolinite first be roasted at a temperature of from about 750° to 950° C. to convert the kaolinite to metakaolinite. Further, the process is useful in producing alumina from bauxite having a high reactive silica content of about 3 to 20 weight percent.

As seen in the flow diagram, the bauxite is first comminuted by grinding. After grinding the bauxite, the ground bauxite is reacted at an elevated temperature with an aqueous solution containing at least 150 grams per liter of sodium bicarbonate to form a solid reaction product comprising dawsonite and impurities. It is preferred that the dawsonite formation reaction be carried out at a reaction temperature preferably of about 125° to 300° C., and, more preferably, the reaction temperature is about 150° to 250° C. In the dawsonite formation reaction step, the reaction pressure is dependent on the reaction temperature. In carrying out the dawsonite formation reaction at a reaction temperature of from about 125° to 300° C. the reaction pressure would be approximately 2 to 30 atmospheres. The reaction time for the dawsonite formation step should be of sufficient duration to ensure the substantial completeness of the reaction. Such reaction time should preferably be at least one-half hour.

Further, in the dawsonite formation reaction step, the aqueous solution contains preferably about 150 to 504 grams per liter of sodium bicarbonate. While not considered essential to the reaction, it is preferable that the aqueous solution contain up to about 212 grams per liter of sodium carbonate. However, it is recommended that the concentration of sodium carbonate be less than the concentration of sodium bicarbonate in the aqueous solution. It is believed that the sodium carbonate, when added to the aqueous solution, enhances the dawsonite formation process.

Also, it has been found that a portion of the silica in the bauxite reacts with the sodium bicarbonate and sodium carbonate solution to form sodium aluminum silicates. The extent of the silica reacting to form the sodium aluminum silicates was found to be temperature-dependent, with lower temperatures during the dawsonite formation step promoting less extensive sodium aluminum silicate formation. In addition, it was also found that adding calcium carbonate to the dawsonite formation reaction can inhibit the formation of sodium aluminum silicates. Therefore, it is preferred to add calcium carbonate to the dawsonite formation reaction; and, if calcium carbonate is added to the dawsonite formation reaction, it is preferable to add the calcium carbonate in an amount equivalent to about 100 to 200 percent by weight of the silica present in the bauxite or aluminum-containing mineral ore to substantially inhibit the formation of sodium aluminum silicates.

The solid reaction product comprising dawsonite and impurities is then separated from the remaining liquor and preferably washed with wash water. The liquor can then be appropriately replenished and recirculated back for reuse to the initial dawsonite formation step. The solid reaction product is then roasted by heating the solid reaction product at a reaction temperature of about 300° to 850° C. to decompose the dawsonite in the solid reaction product. Carbon dioxide and water are normally released during the roasting process. Preferably the reaction temperature during roasting is from about 500° to 750° C. to decompose the dawsonite in the solid reaction product to sodium aluminate. Although not generally preferred, the solid reaction product can be roasted at a reaction temperature of from about 300° to 500° C. to decompose the dawsonite to form rho-alumina. Preferably, the solid reaction product should be roasted for a reaction time sufficient to ensure a substantially complete decomposition of the solid reaction product. Preferably, the roasting reaction time should be at least one-half hour in duration.

If the roasting reaction temperature is from about 500° to 750° C. to decompose the dawsonite in the solid reaction product to sodium aluminate, it is then preferred to leach with water the sodium aluminate from the decomposed solid reaction product to form a sodium aluminate solution and leaving a solid residue. Preferably, the water used for leaching also contains sodium hydroxide, and more preferably, the sodium hydroxide should be in dilute solution. While not essential to the present invention, the use of the sodium hydroxide serves to stabilize the liquor resulting from the leaching of the sodium aluminate from the decomposed solid reaction product, as well as to improve the efficiency of the leaching process.

After leaching for a sufficient time to ensure substantially complete extraction of the sodium aluminate from the decomposed solid reaction product, the sodium aluminate solution is then preferably separated from the remaining residue. The remaining residue is then preferably washed with water prior to being disposed. However, if the previous step of roasting to decompose the dawsonite in the solid reaction product is carried out at a reaction temperature of from about 500° to 750° C. using a reducing atmosphere preferably including hydrogen and carbon monoxide, it is possible to partially reduce any iron mineral impurities present to a magnetically active form. Magnetically active iron impurities present in the final residue after separating the sodium aluminate solution from this residue, can then be magnetically separated from the final residue in a form which may have use in the production of iron or steel, as well as other uses.

In the preferred practice of the present invention, aluminum trihydroxide is precipitated from the sodium aluminate solution by reacting this solution with carbon dioxide. It is further preferred to seed the sodium aluminate solution with aluminum trihydroxide crystals to enhance precipitation of aluminum trihydroxide from the solution.

In the preferred process of the present invention, the final steps after precipitation of the aluminum trihydroxide are: (i) separating the aluminum trihydroxide from the solution; (ii) washing, preferably with water, the aluminum trihydroxide; and (iii) calcining the aluminum trihydroxide, preferably at a temperature of about 950° to 1200° C., thereby to form alumina.

While not essential to the preferred practice of the present invention, it is desirable and practical to recirculate and reuse the solution from which the precipitated aluminum trihydroxide has been separated. If carbon dioxide is used to precipitate the aluminum trihydroxide from the sodium aluminate solution, the remaining solution, in the preferred practice of the present invention, would essentially be an aqueous sodium carbonate solution. Also, if seed aluminum trihydroxide is used to enhance precipitation of aluminum trihydroxide from the sodium aluminate solution, then the remaining solution would also contain sodium hydroxide. To prepare this solution for reuse, in the preferred practice of the invention an evaporator is employed to eliminate excess water and an absorber is also employed to add carbon dioxide to the solution to convert the sodium carbonate and any sodium hydroxide in the solution to sodium bicarbonate. This sodium bicarbonate solution formed after the carbon dioxide absorption can, after any necessary replenishment to achieve proper concentration, then be recirculated to the initial dawsonite formation step.

The following comprehensive example will serve to illustrate some specific embodiments of the present invention. While this example illustrates the present invention, the example is not intended to limit the present invention thereto.

EXAMPLE

A sample of Trombetas (Brazil) buaxite was ground to $-100$ mesh size. X-ray fluoroscence (XRF) analysis of this sample showed the following:

| XRF Analysis of Trombetas Bauxite Sample | |
|---|---|
| | % by weight |
| $SiO_2$ | 4.51 |
| $Fe_2O_3$ | 10.7 |
| $TiO_2$ | 0.97 |
| $Al_2O_3$ | 54.3 |
| CaO | 0.10 |

Further, X-ray diffraction (XRD) analysis of this bauxite sample had shown that of this bauxite sample's 54.3% total $Al_2O_3$ content, nearly 50% (54.3%−4.3%=50%) of the $Al_2O_3$ content was in the form of gibbsite and the remaining 4.3% of the total $Al_2O_3$ content was in the form of kaolinite.

100 grams of this bauxite sample was digested in an autoclave with $NaHCO_3$ solution under the following conditions:

Temperature: 200° C.
Time: 1 hour
Liquor volume: 1.5 L
Quantity of $NaHCO_3$: 300 g The autoclave was then discharged and the solids were separated by filtration and dried at 105° C. The dried solid mass was roasted at 550° C. for 1½ hours. After cooling, the roasted mass was leached for 20 minutes with 1.2 liters of boiling 20 g/L NaOH solution in a stirred vessel. The leach liquor was separated from the residue by filtration. Aluminum trihydroxide was precipitated from the liquor by slowly bubbling $CO_2$ gas through the liquor for 3 hours at 71° C.

Both the aluminum trihydroxide product and residue were washed with hot water, dried and analyzed. The following tables show the analysis of the impurities in the aluminum trihydroxide product and the analysis of the residue:

TABLE I

| Aluminum Trihydroxide Product | |
|---|---|
| | % by weight |
| $SiO_2$ | 0.028 |
| $Fe_2O_3$ | 0.005 |
| $TiO_2$ | 0.000 |
| $Na_2O$ | 0.34 |
| CaO | 0.008 |
| MgO | 0.000 |
| ZnO | 0.001 |
| CuO | 0.000 |
| $Ga_2O_3$ | 0.003 |
| $V_2O_5$ | 0.0002 |
| NiO | 0.000 |
| MnO | 0.0002 |
| $Cr_2O_3$ | 0.0001 |
| $B_2O_3$ | 0.001 |
| $ZrO_2$ | 0.000 |

TABLE II

| Residue | |
|---|---|
| | % by weight |
| $SiO_2$ | 17.5 |
| $Fe_2O_3$ | 41.4 |
| $TiO_2$ | 4.0 |
| $Al_2O_3$ | 19.8 |
| $Na_2O$ | 10.9 |
| CrO | 0.48 |
| MgO | 0.30 |

The following equation shows the efficiency of the extraction of the alumina from the ore sample:

$$\text{Extraction Efficiency} = \frac{\left(\% \ Al_2O_3 \text{ in Bauxite} - \frac{((\% \ Fe_2O_3 + \% \ TiO_2) \text{ in bauxite} \times \% \ Al_2O_3 \text{ in residue})}{(\% \ Fe_2O_3 + \% \ TiO_2) \text{ in residue}}\right) \times 100}{\% \ Al_2O_3 \text{ in bauxite}}$$

$$= \frac{\left[54.3 - \left(\frac{11.67}{45.40} \times 19.8\right)\right] \times 100}{54.3} = 90.6\% \text{ of total } Al_2O_3 \text{ in the bauxite sample}$$

Results show that in this example 90.6% of the alumina in bauxite has been extracted; and the aluminum trihydroxide product was purer than the usual product from the Bayer process. The aluminum trihydroxide product was exceptionally white and both the digestion and leach liquors were colorless.

Additional tests were carried out using an identical bauxite sample. Test conditions and residue analyses were as follows:

| Test | A | B | C |
|---|---|---|---|
| Conditions: | | | |
| Digest Temp. °C. | 200 | 200 | 180 |
| CaCO$_3$ added | Yes | Yes | No |
| Roasting Temp. °C. | 650 | 650 | 650 |
| Residue Analysis (% by weight): | | | |
| SiO$_2$ | 15.6 | 10.4 | 13.4 |
| Fe$_2$O$_3$ | 43.5 | 32.8 | 41.9 |
| TiO$_2$ | 4.24 | 2.94 | 4.09 |
| Al$_2$O$_3$ | 17.5 | 10.8 | 29.0 |
| Na$_2$O | 6.5 | 3.8 | 6.8 |
| CaO | 7.45 | 22.1 | 0.25 |
| Alumina Extraction Efficiency: | 92.1% | 93.5% | 86.4% |

Quite surprisingly, these results show both improved alumina extraction efficiency and a decrease in the amount of Na$_2$O in the residue in those tests where CaCO$_3$ has been added. In Test B, the CaCO$_3$ added was approximately double the quantity of CaCO$_3$ added in Test A.

While the present invention has been described in terms of preferred embodiments, it will be apparent to those skilled in the art that certain modifications and adaptations within the scope of the present invention can be made to the process based upon the teachings presented herein and would be consistent with the invention as defined in the claims hereto appended.

What is claimed is:

1. A process for production of alumina from aluminum-containing mineral ore comprising:
    (a) comminuting an aluminum-containing mineral ore selected from the group consisting of aluminous clay having an alumina content of about 20 to 40 weight percent, bauxite, kaolinite and metakaolinite;
    (b) reacting the comminuted mineral ore at an elevated temperature of about 125° to 300° C. with an aqueous solution containing at least 150 grams per liter of sodium bicarbonate, thereby to form a solid reaction product comprising dawsonite and impurities; and
    (c) converting the dawsonite to alumina.

2. The process of claim 1 wherein the aluminum-containing mineral ore is bauxite.

3. The process of claim 2 wherein the bauxite has a silica content of from about 3 to 20 weight percent.

4. The process of claim 1 wherein the aluminum-containing mineral ore is kaolinite.

5. The process of claim 1 wherein the aluminum-containing mineral ore is metakaolinite.

6. The process of claim 1 wherein the aluminum-containing mineral ore is an aluminous clay having an alumina content of from about 20 to 40 weight percent.

7. The process of claim 1 wherein the reaction temperature of step (b) is about 150° to 250° C.

8. The process of claim 1 wherein calcium carbonate is added to the reaction of step (b).

9. The process of claim 8 wherein the aluminum-containing mineral ore comprises silica and the calcium carbonate is added to the reaction of step (b) in an amount equivalent to about 100 to 200% by weight of the silica.

10. The process of claim 1 wherein the aqueous solution of step (b) contains about 150 to 504 grams per liter of sodium bicarbonate.

11. The process of claim 1 or 10 wherein the aqueous solution of step (b) contains up to about 212 grams per liter of sodium carbonate, the concentration of sodium carbonate being less than the concentration of sodium bicarbonate.

12. The process of claim 1 wherein step (c) includes:
    (1) heating the solid reaction product of step (b) at a reaction temperature of about 300° to 850° C., thereby to decompose the dawsonite in the solid reaction product.

13. The process of claim 12 wherein the reaction temperature is from about 500° to 750° C. thereby to decompose the dawsonite in the solid reaction product to sodium aluminate.

14. The process of claim 13 wherein step (c) further includes:
    (2) leaching with water the sodium aluminate from the decomposed solid reaction product to form a sodium aluminate solution and leaving a solid residue.

15. The process of claim 14 wherein the water contains sodium hydroxide.

16. The process of claim 14 or 15 wherein step (c) further includes:
    (3) separating the sodium aluminate solution from the residue.

17. The process of claim 16 wherein step (c) further includes:
    (4) reacting the sodium aluminate solution with carbon dioxide, thereby to precipitate aluminum trihydroxide.

18. The process of claim 17 wherein step (c) further includes:
    (5) seeding the sodium aluminate solution with aluminum trihydroxide crystals in step (4), thereby to enhance precipitation of aluminum trihydroxide from the solution.

19. The process of claim 17 wherein step (c) further includes:
    (5) separating the aluminum trihydroxide from the solution;
    (6) washing the aluminum trihydroxide; and
    (7) calcining the aluminum trihydroxide at a temperature of about 950° to 1200° C., thereby to form alumina.

20. The process of claim 18 wherein step (c) further includes:
    (6) separating the aluminum trihydroxide from the solution;
    (7) washing the aluminum trihydroxide; and
    (8) calcining the aluminum trihydroxide at a temperature of about 950° to 1200° C., thereby to form alumina.

* * * * *